US010035580B2

(12) United States Patent
Schroeder et al.

(10) Patent No.: US 10,035,580 B2
(45) Date of Patent: Jul. 31, 2018

(54) FORMVARIABLE AERODYNAMIC FAIRING BODY FOR A FLAP ACTUATOR MECHANISM OF AN AIRCRAFT

(71) Applicant: Airbus Operations GmbH, Hamburg (DE)

(72) Inventors: Karsten Schroeder, Buchholz idN (DE); Hendrik Friedel, Weyhe (DE)

(73) Assignee: Airbus Operations GmbH (DE)

( * ) Notice: Subject to any disclaimer, the term of this patent is extended or adjusted under 35 U.S.C. 154(b) by 18 days.

(21) Appl. No.: 14/089,793

(22) Filed: Nov. 26, 2013

(65) Prior Publication Data

US 2014/0151510 A1   Jun. 5, 2014

Related U.S. Application Data

(60) Provisional application No. 61/731,605, filed on Nov. 30, 2012.

(30) Foreign Application Priority Data

Nov. 30, 2012 (DE) .................. 10 2012 111 690

(51) Int. Cl.
*B64C 3/50* (2006.01)
*B64C 9/38* (2006.01)
(Continued)

(52) U.S. Cl.
CPC .................. *B64C 9/38* (2013.01); *B64C 7/00* (2013.01); *B64C 9/16* (2013.01); *Y10T 29/49826* (2015.01)

(58) Field of Classification Search
CPC .... B64C 9/38; B64C 9/16; B64C 7/00; B64C 3/50; B64F 5/0009; Y10T 29/49826
(Continued)

(56) References Cited

U.S. PATENT DOCUMENTS 2,609,166 A *   9/1952   Bellam ......................... 244/216
3,724,784 A *   4/1973   Von Ohain ............ B64C 23/005
                                                                244/207
(Continued)

FOREIGN PATENT DOCUMENTS

DE            36 41 247 A1     6/1988
DE    10 2005 045 759 A1      4/2007
(Continued)

OTHER PUBLICATIONS

Flybox, "Electronic Flap Controller", 2011, p. 5.*
Schoensleben, "Integrated Trailing Edge Flap Track Mechanism for Commercial Aircraft",2005, p. 19.*

*Primary Examiner* — Assres H Woldemaryam
(74) *Attorney, Agent, or Firm* — Lerner, David, Littenberg, Krumholz & Mentlik, LLP

(57) ABSTRACT

An aerodynamic fairing body for an aircraft, a corresponding aircraft and a corresponding method of manufacture for an aerodynamic fairing body are described. The fairing body is configured so as to accommodate a flap adjustment mechanism. Further, the fairing body is configured so as to be arranged at a predetermined distance from an engine of the aircraft, which produces a blast which varies depending on the flight phase. Furthermore, the fairing body is configured so as to be varied in shape in such a way that the fairing body is located outside the blast of the engine permanently. In other words, the fairing body can be varied in shape in such a way that it is located outside the engine blast in any flight phase of the aircraft.

10 Claims, 2 Drawing Sheets

(51) Int. Cl.
*B64C 7/00* (2006.01)
*B64C 9/16* (2006.01)

(58) Field of Classification Search
USPC .......................... 244/213, 215, 216; 29/428
See application file for complete search history.

(56) References Cited

U.S. PATENT DOCUMENTS

| | | | | |
|---|---|---|---|---|
| 4,283,029 | A | * | 8/1981 | Rudolph ........................ 244/215 |
| 4,434,959 | A | * | 3/1984 | Rudolph ........................ 244/215 |
| 4,448,375 | A | * | 5/1984 | Herndon ........................ 244/216 |
| 4,712,750 | A | | 12/1987 | Ridgwell |
| RE32,907 | E | * | 4/1989 | Rudolph ........................ 244/215 |
| 4,854,528 | A | * | 8/1989 | Hofrichter .................... 244/215 |
| 4,881,704 | A | * | 11/1989 | Hofrichter .................... 244/213 |
| 4,995,575 | A | * | 2/1991 | Stephenson .................... 244/216 |
| 5,161,757 | A | * | 11/1992 | Large ........................ B64C 9/18 |
| | | | | 244/213 |
| 5,564,655 | A | * | 10/1996 | Garland et al. ............... 244/216 |
| 7,051,982 | B1 | * | 5/2006 | Johnson ........................ 244/215 |
| 7,520,471 | B2 | * | 4/2009 | Reckzeh et al. ............... 244/215 |
| 8,844,878 | B2 | * | 9/2014 | Voss et al. ................... 244/216 |
| 2008/0067292 | A1 | | 3/2008 | Bonnaud et al. |
| 2008/0191089 | A1 | * | 8/2008 | Reckslek et al. ............. 244/99.3 |
| 2009/0261198 | A1 | | 10/2009 | Bonnaud et al. |
| 2009/0308982 | A1 | * | 12/2009 | Schlipf ........................ 244/215 |
| 2010/0006707 | A1 | | 1/2010 | Reckzeh et al. |
| 2012/0012696 | A1 | * | 1/2012 | Sakurai ..................... B64C 9/16 |
| | | | | 244/99.3 |
| 2012/0112011 | A1 | | 5/2012 | Emunds |
| 2013/0214092 | A1 | | 8/2013 | Friedel |
| 2014/0145039 | A1 | * | 5/2014 | Beyer et al. ................. 244/215 |

FOREIGN PATENT DOCUMENTS

| | | |
|---|---|---|
| DE | 10 2009 003 084 A1 | 11/2010 |
| DE | 10 2010 032 224 A1 | 1/2012 |
| EP | 1 627 811 A1 | 2/2006 |
| GB | 2 488 172 A | 8/2012 |
| WO | 2012/013332 A2 | 2/2012 |

* cited by examiner

FORMVARIABLE AERODYNAMIC FAIRING BODY FOR A FLAP ACTUATOR MECHANISM OF AN AIRCRAFT

CROSS-REFERENCE TO RELATED APPLICATIONS

This application claims the benefit of the filing date of German Patent Application No. 10 2012 111 690.3 filed Nov. 30, 2012 and of U.S. Provisional Patent Application No. 61/731,605 filed Nov. 30, 2012, the disclosure of which applications is hereby incorporated herein by reference.

FIELD OF THE INVENTION

The invention relates to the structure and kinematics of aerodynamic systems for aircraft. In particular, the invention relates to a variable-shape aerodynamic fairing body for a flap adjustment mechanism, to an aircraft comprising an aerodynamic fairing body and to a corresponding method of manufacture for an aerodynamic fairing body.

BACKGROUND OF THE INVENTION

High lift elements such as trailing edge flaps or landing flaps may be provided on aeroplane wings. They may be extended in the take-off and landing phases of the aeroplane so as to increase the lift. During cruising, also known as cruising flight, the high lift elements can be retracted so as to reduce the flow resistance. For example, high lift elements of this type are known from DE 10 2010 032 224 A1 and from WO 2012 013 332 A2.

The adjustment mechanism for the high lift elements may be provided in fairings for example on the underside of the aeroplane wing. In this context, the fairing should meet particular specifications so as to ensure optimum aerodynamics.

For example, if particularly large engines are provided on the aeroplane or located close to the fairings of the adjustment mechanisms, the fairings may extend into the engine blast. This can lead to vibrations and to an additional load on the fairings.

Fairings are further known, which are made smaller or shorter than usual, so as to prevent the vibrations and the additional load. However, this type of configuration of the fairings may lead to an increase in the flow resistance, since in this case the dimensions of the fairing deviate from the aerodynamic specifications. Alternatively, the fairings may be provided with reinforcing elements so as to withstand the additional load. However, these lead to an undesirable increase in weight. Further, the oscillations or vibrations of the fairings may be reduced by attaching additional weights to the fairings, which change the resonant frequency of the fairings.

BRIEF SUMMARY OF THE INVENTION

Therefore a need can arise for an aerodynamic fairing body, for an aeroplane comprising an aerodynamic fairing body and for a corresponding method of manufacture for an aerodynamic fairing body, which make it possible in particular to reduce the load on the fairings without increasing the flow resistance in doing so.

In accordance with a first aspect of the invention, an aerodynamic fairing body for an aircraft is proposed. The aerodynamic fairing body is configured so as to accommodate a flap adjustment mechanism. Further, the fairing body is configured so as to be arranged at a predetermined distance from an engine of the aircraft which produces a blast which varies depending on the flight phase. In this context, the fairing body is configured so as to be varied in shape in such a way that the fairing body is located outside the blast of the engine in every flight phase of the aircraft.

In other words, an idea of the present invention is based on providing a fairing body which is variable in shape in such a way that it is located outside the blast of the engine permanently, that is to say in any flight phase of the aircraft, and at the same time meets the aerodynamic requirements as regards the dimensioning at least during cruising. For example, if required, part of the fairing body may be retracted into and extended out of another part of the fairing body telescopically for this purpose. Alternatively, part of the fairing body may be inclined or tilted with respect to the remainder of the fairing body until this part is located outside the range of the engine blast. In this context, the fact that the fairing body is located outside the blast of the engine means that the distance between all of the regions of the fairing body and the blast is sufficiently large to prevent vibrations.

In this way, the fairing body can be adapted to the variable range of the engine blast depending on the flight situation or flight manoeuvre. For example, the fairing body could be retracted or shortened during the take-off and landing phases, in such a way that the engine blast does not bring about any additional loads or any vibrations on the fairing body. Thus, additional reinforcements on the fairing body can be dispensed with, and weight and material costs can thus be reduced. In addition, this can reduce or prevent a thermal load on the fairing body.

Further, the fairing body may be extended or lengthened to an aerodynamically favourable length during cruising phases. As a result, the flow resistance and thus also the energy or fuel consumption of the aircraft can be reduced.

To summarise, in known fairing bodies, extending flaps for example during take-off and landing phases can lead to the fairing body for example moving downwards and thus coming closer to the engine jet. This leads to undesired vibrations. By contrast, an overall shortening of the fairing body leads to a higher resistance. This can be a drawback in particular during cruising, that is to say during cruising flight.

The fairing body according to an exemplary embodiment of the invention makes it preferably possible to retract the fairing body when the flaps are extended and to extend the fairing body when the flaps are retracted. The inverse movements or those in opposite directions of the flaps and the fairing body may for example be brought about by a mechanical coupling. In this way, additional drive elements for varying the shape of the fairing body can be dispensed with.

The aerodynamic fairing body may be provided on an aircraft, in particular on an aeroplane. For example, the aerodynamic fairing body may be part of an aeroplane wing, in particular of a primary wing. The aerodynamic fairing body may further be arranged for example on an underside of an aeroplane wing. In particular, the aerodynamic fairing body may be retrofitted on previously manufactured aircraft. In this context, the fairing body may form an aerodynamic system together with the engine.

The fairing body may also be referred to as "flap support fairing" (FSF) or "flap track fairing" (FTF). In particular, the dimensions of the fairing body when extended comply with a predetermined width-to-length ratio, in such a way that the fairing body brings about as little flow resistance as possible. The fairing body is thus advantageously shaped aerodynamically as a whole.

A flap adjustment mechanism may be arranged in the fairing body. The flap adjustment mechanism may be a drive and an actuator for adjusting flaps, for example trailing edge flaps, high lift flaps, landing flaps and control flaps.

The fairing body may enclose the flap adjustment mechanism in whole or in part. Further, a cavity, into which part of the fairing body can be retracted, may be provided in the fairing body. The shape of the fairing body can be varied during flight.

The engine may for example likewise be provided on the underside of an aeroplane wing and comprise a gas turbine, a compressor, a transmission and optionally a piston engine. In this context, the engine creates a blast during operation, also known as an engine blast or "engine efflux".

The engine may be arranged at a predetermined distance from the fairing body. However, the range and direction of the blast of the engine may vary depending on the flight phase of the aircraft. Further, the fairing body may be moved towards the engine jet, for example when the landing flaps are extended, in such a way that the distance between the engine jet and the fairing body can be reduced in particular flight phases. In these flight phases, the shape of the fairing body is varied in such a way that the fairing body is located outside the engine blast permanently, in spite of the change in distance and in spite of the larger size of the engine blast. In this context "permanently" can mean during any flight manoeuvre or during any flight phase.

In this context, "outside the engine blast" means sufficiently far away from the engine blast so as to prevent vibrations. In particular, this may mean that the excess speed brought about by the engine, which is measurable in all regions of the fairing body, is at most 10%, in particular at most 5% and preferably at most 1% of the excess speed measurable directly at the engine output.

In accordance with an embodiment of the invention, the variation in the shape of the fairing body is inversely mechanically coupled to a retraction and/or extension of a flap of the aircraft.

In this context, the flaps may for example be high lift elements such as trailing edge flaps or landing flaps. In this context, "inverse" means that the movements of the flap and of the fairing body are in opposite directions. If the flap is extended, the fairing body is simultaneously retracted, that is to say converted into the retracted state. By contrast, if the flap is retracted, the fairing body is simultaneously converted into the extended state. This is brought about by means of a mechanical coupling. For example, the flap adjustment mechanism may bring about this mechanical coupling. In this way, additional drive elements can be dispensed with.

In this context, when the flap is extended a rear module of the fairing body may be retracted into a front part, and thus brought out of the range of the engine jet. Alternatively, the rear module may be angled upwards when the flap is extended, so as thus to be brought out of the range of the engine jet.

In accordance with a further embodiment of the invention, the variation in the shape of the fairing body corresponds to a variation in length or compression in terms of the direction of flight. In this context, the length of the fairing body may be measured parallel to a direction of flight or to a longitudinal axis of the aircraft.

In particular, the variation in shape may correspond to shortening the fairing body at a low flight speed, for example during take-off and landing phases. Further, the variation in shape may correspond to lengthening the fairing body at high flight speeds, for example during cruising flight phases.

In accordance with a further embodiment of the invention, the fairing body comprises a front module and a rear module. In this context, the shape of the fairing body is varied by adjusting the rear module with respect to the front module. In this context, adjustment may comprise changing the position and/or orientation of the rear module with respect to the front module.

The front module may be referred to as a fore element and the rear module may be referred to as an aft element. The shape or length may be varied for example by retracting the rear module into the front module of the fairing body.

Alternatively or in addition, the shape or length can be varied by changing the angle of the fairing body. In this context, the front module may for example be tilted or inclined with respect to the rear module of the fairing body, in such a way that the longitudinal axes of these modules are at an angle of other than 180° to one another. As a result of varying the angle, the overall length of the fairing body is also varied in a projection parallel to the direction of flight.

In addition, the fairing body may be subdivided into three regions, in such a way that a further central module is provided between the front and rear modules. In this context, all of the modules can be tilted with respect to one another. If for example the central module is tilted with respect to the front module when the landing flaps are extended, the rear module may extend into the engine blast. However, the rear module may now be rotated or tilted in the opposite direction, in such a way that the rear module is located outside the engine blast even when the landing flaps are extended.

In accordance with a further embodiment of the invention, the front module of the fairing body is configured so as to receive the rear module at least in part. That is to say, the rear module can be slid into a cavity of the front module.

For this purpose, the fairing body may for example be conical in form or taper from the front module to the rear module. Further, the front module may be provided with a corresponding cavity. That is to say, the flap adjustment mechanism in the interior of the fairing body merely takes up part of the space inside the fairing body. In particular, the rear module may be guided telescopically into the front module.

In accordance with a further embodiment of the invention, the aerodynamic fairing body comprises a rail element. In this context, the front module is connected to the rear module by means of the rail element. Further, the rear module is configured so as to be moved along the rail element into the front module in a linear movement.

For example, the rail element may be in the form of a guide rail or a telescopic rail. Further, the rail element may for example be arranged or fixed on the inside of the front module and on the inside or on the outside of the internal element. By virtue of the configuration of the fairing body with a rail element, a simple technical construction and implementation can be ensured. The movement of the modules of the fairing body in a linear movement with respect to one another can lead to low wear, and thus to a reduced maintenance cost, by comparison with complex movement sequences.

In addition or alternatively, a lever element may be provided on the front and/or rear module of the fairing body. By means of the lever element, the rear module can be tilted with respect to the front module or pivoted into the front module.

In accordance with a further embodiment of the invention, the fairing body is configured so as to take on a retracted state during a take-off phase and/or a landing phase of the aircraft and, further, to take on an extended state during a cruising phase of the aircraft. The total length of the fairing body in the direction of flight or in a projection onto the longitudinal axis of the aircraft is smaller in the retracted state than in the extended state.

In accordance with a further embodiment of the invention, the fairing body is dimensioned in such a way that the width of the fairing body is 1 to 20% and in particular 5% to 12% of the length of the fairing body in the extended state.

In this context, the width of the fairing body corresponds to a dimension of the fairing body perpendicular to the direction of flight. The width may for example be established by way of the dimensions of the flap adjustment mechanism. In this context, the length of the fairing body corresponds to a dimension of the fairing body parallel to the direction of flight or parallel to the longitudinal axis of the aircraft.

By way of a dimensioning of this type of the fairing body, the aerodynamic properties of the fairing body can be optimised. In particular, flow resistance can be minimised in this way. In this context, the width-to-length-ratio may be between 1 to 8.3 and 1 to 20.

In accordance with a further embodiment of the invention, the variation in the shape of the fairing body is brought about by the flap adjustment mechanism. That is to say, in addition to the actual function of the flap adjustment mechanism, namely to move the flaps of the aircraft, the flap adjustment mechanism is further configured so as to vary the shape of the fairing body. For example, the flap adjustment mechanism may be configured so as to extend the landing flaps and to guide the rear module into the front module or to tilt the rear module with respect to the front module. This may take place simultaneously or sequentially. In this context, the flap adjustment mechanism may be functionally linked to the fairing body.

In this way, shortening the fairing body may be coupled to extending landing flaps, for example. In this context, the installation of additional actuators and drives can be dispensed with.

Alternatively, a separate mechanism comprising a drive and/or an actuator for varying the shape of the fairing body may be provided. As a result, the shape of the fairing body can be varied independently of other components of the aircraft.

In accordance with a second aspect of the invention, an aeroplane is proposed. The aeroplane comprises an aerofoil, an engine and an above-disclosed aerodynamic fairing body. In this context, the engine produces a blast which varies depending on the flight phase. The aerodynamic fairing body is arranged on the aerofoil of the aeroplane. Preferably, the aeroplane comprises at least one engine and at least one fairing body on each aerofoil.

In accordance with a further embodiment of the invention, the aircraft further comprises a flap, which is configured so as to be retracted and extended. In this context, the fairing body is coupled to the flap in such a way that said body is converted into a retracted state when the flap is extended. Further, the fairing body is coupled to the flap in such a way that said body is converted into an extended state when the flap is retracted.

In this context, the coupling can be brought about mechanically. For example, both the flap and the fairing body may be driven by means of the flap adjustment mechanism arranged in the fairing body. As a result, additional drive mechanisms and drive systems for the fairing body can be dispensed with. In this context, the coupling can be configured in such a way that the movement of the flaps and the variation in the shape of the fairing body take place in opposite directions.

In accordance with a third aspect of the invention, a method for manufacturing an above-disclosed aerodynamic system is proposed. The method comprises the following steps: arranging a fairing body on a flap adjustment mechanism of an aircraft, at a predetermined distance from an engine which produces a blast which varies depending on the flight phase; and configuring the fairing body in such a way that it can be varied in shape, in particular during flight, in such a way that the fairing body is located outside the blast of the engine permanently, that is to say in every flight situation.

Further features and advantages of the invention will be apparent to a person skilled in the art from the following description of exemplary embodiments—which should not, however, be taken as limiting the invention—with reference to the appended drawings.

BRIEF DESCRIPTION OF THE DRAWINGS

All of the drawings are merely schematic illustrations of devices according to the invention or components thereof. In particular, distances and size relationships are not shown to scale in the drawings. Like or identical elements are provided with like reference numerals in the various drawings.

DETAILED DESCRIPTION

Figure 1:
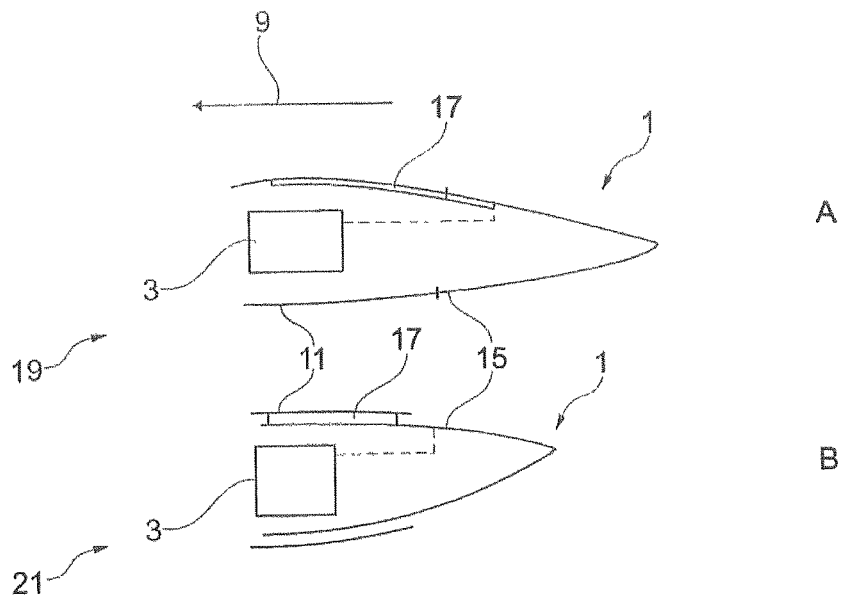
FIG. 1A is a cross-section through a fairing body in accordance with a first embodiment of the invention in an extended state.
FIG. 1B is a cross-section through a fairing body in accordance with a first embodiment of the invention in a retracted state.
Figure 2:
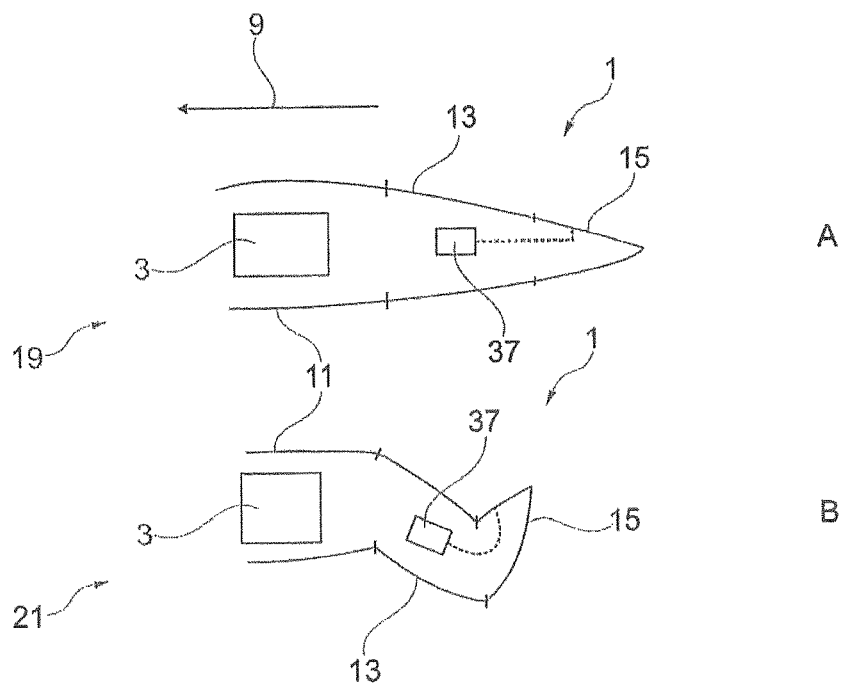
FIG. 2A is a cross-section through a fairing body in accordance with a second embodiment of the invention in an extended state.
FIG. 2B is a cross-section through a fairing body in accordance with a second embodiment of the invention in a retracted state.
Figure 3:
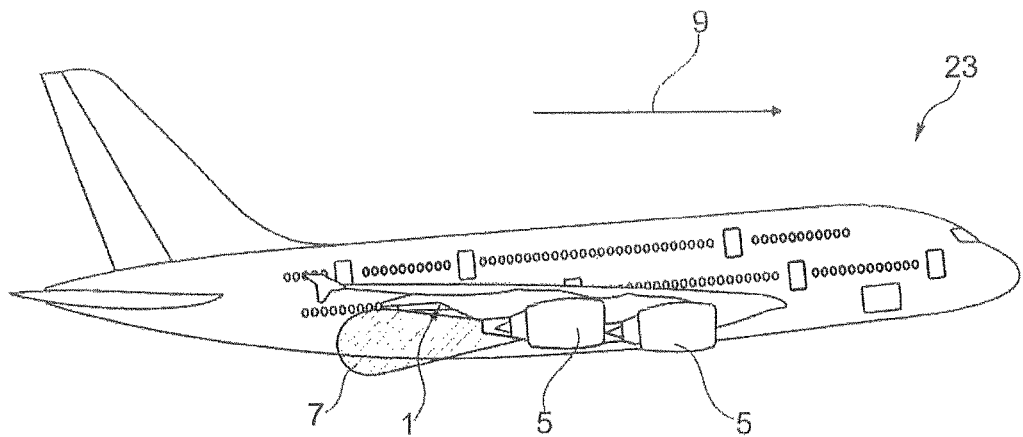
FIG. 3 is a side view of an aircraft in accordance with an embodiment of the invention.
Figure 4:
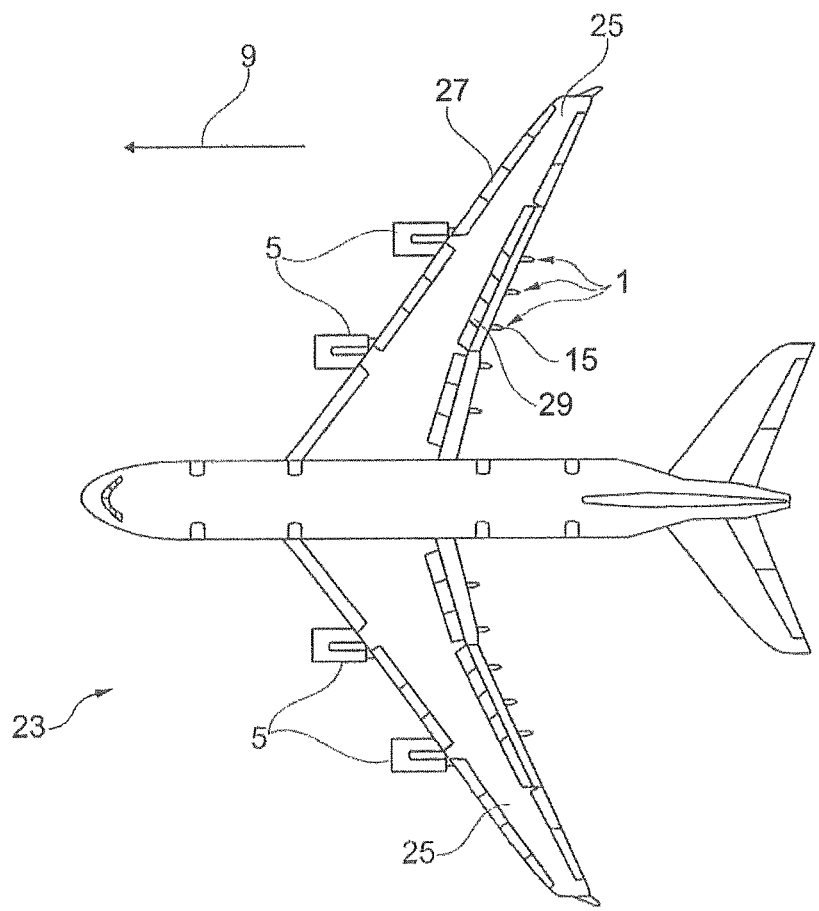
FIG. 4 is a plan view of an aircraft in accordance with an embodiment of the invention.

FIG. 1 and FIG. 2 show aerodynamic fairing bodies 1. The fairing bodies 1 are each configured so as to accommodate a flap adjustment mechanism 3. In this context, the flap adjustment mechanism 3 may be configured so as to retract and extend high lift elements of an aircraft 23, such as trailing edge flaps 29, leading edge flaps 27 or landing flaps. The corresponding aircraft 23 comprising the high lift elements 27, 29 is shown in FIG. 3 and FIG. 4.

In this context, the fairing bodies 1 may be arranged on the underside of a wing 25 of the aircraft 23. Further, an engine 5 of the aircraft 23 may likewise be provided on an underside of the wing 25 of the aircraft 23. In particular, the fairing bodies 1 may be arranged at a predetermined distance from the engine 5.

The engine 5 produces a blast 7. This is illustrated in FIG. 3. The dimensions, in particular the direction and range, of the engine blast may change depending on the flight manoeuvre and flight phase. Further, the position of the fairing body 1 with respect to the engine 5 may vary for example when the landing flaps are extended. For example, the fairing body 1 may move downwards, and thus come closer to the engine blast 7, when the flaps 27, 29 are extended. In conventional fairings, these factors may cause them to extend into the engine blast and thus be made to vibrate or be subjected to additional loads.

By contrast, the fairing bodies 1 shown in FIG. 1 and FIG. 2 are configured in such a way that they are positioned outside the engine blast 1 in any flight situation as a result of variations in the shape of the fairing body 1. As is shown in FIG. 1B, in this context part of the fairing body 1 may pass telescopically into a further part of the fairing body 1. Further, as is shown in FIG. 2B, part of the fairing body 1 may be inclined or tilted with respect to the remainder of the fairing body in such a way that the total length of the fairing body 1 is reduced and it is thus located outside the range of the engine blast 7. In particular, the fairing body 1 may be coupled to the flaps 27, 29 shown in FIG. 4 in such a way that the variation in the shape of the fairing body 1 is mechanically coupled to a retraction or extension of the flaps 27, 29.

The fairing body is shown in an extended state 19 in FIG. 1A and FIG. 2A and in a retracted state 21 in FIG. 1B and FIG. 2B. The total length of the fairing body in terms of the direction of flight 9 or the longitudinal axis of the aircraft 23 is shorter in the retracted state 21 than in the extended state 19.

As is shown in FIG. 1B and FIG. 2B, the fairing body 1 may be retracted or shortened for example during take-off and landing phases, in such a way that the engine blast 7 does not bring about any additional loads or any vibrations on the fairing body 1. As a result, by contrast with known fairings, additional reinforcements can be dispensed with.

During cruising phases of the aircraft 23, the fairing body 1 can be extended or lengthened to an aerodynamically favourable length. This extended state 19 is illustrated in FIG. 1A and FIG. 2A. As a result of the aerodynamically favourable dimensioning, the flow resistance and thus also the energy or fuel consumption of the aircraft 23 can be reduced. In particular, in the extended state 19, the fairing body 1 may be dimensioned in such a way that the width of the fairing body is 5% to 12% of the length. In this context, the width can be determined perpendicular to the direction of flight 9 and the length can be determined parallel to the direction of flight 9.

The conversion of the fairing body 1 from the extended state 19 shown in FIG. 1A and FIG. 2A into the retracted state 21 shown in FIG. 1B and FIG. 2B may be mechanically coupled to an extension of the flaps 27, 29. Further, the conversion of the fairing body 1 from the retracted state 21 shown in FIG. 1B and FIG. 2B into the extended state 19 shown in FIG. 1A and FIG. 2A may be mechanically coupled to a retraction of the flaps 27, 29. In this context, the movement of the fairing body 1 may take place in the opposite direction from or inversely with respect to the movement of the flaps 27, 29. Further, the variation in the shape of the fairing body 1 may be mechanically coupled to the retraction and extension of the flaps 27, 29, for example by means of the flap adjustment mechanism 3.

The fairing body 1 shown in FIG. 1 is formed from two parts, a front module 11 and a rear module 15. In this context, the flap adjustment mechanism 3 is arranged in the front module 11. Further, there is a cavity in the front module 11 for receiving the rear module 15. In this context, the modules 11, 15 are conical in form, in such a way that they can be slid into one another telescopically.

A rail element 17 is arranged between the front module 11 and the rear module 15. The rail element 17 is configured as a telescope rail or as a guide rail, and guides the rear module 15 into the front module 11 in a linear movement. In this context, the front module 11 may receive the rear module 15 as a whole or only in part.

In the embodiment of FIG. 1, the rear module 15 is moved into the front module 11 by means of the flap adjustment mechanism 3. For this purpose, the flap adjustment mechanism 3 is functionally linked to the front module 11 and/or to the rear module 15. In this way, the flap adjustment mechanism 3 may both position the flaps 27, 29 and vary the shape of the fairing body 1, in such a way that no additional components are necessary.

In this context, the flap adjustment mechanism 3 may be arranged in a movable region of the fairing body 1 or in a region in which the rear module 15 and the front module 11 overlap, as shown in FIG. 1. Alternatively, the flap adjustment mechanism 3 may be arranged in a non-movable, stationary region of the fairing body 1, as shown in FIG. 2. In FIG. 2, unlike in FIG. 1, the shape of the fairing body 1 is varied by a separate fairing body drive 37 rather than by the flap adjustment mechanism. By way of the additional fairing body drive 37, the shape of the fairing body 1 can be adapted to the flight situation independently of other components of the aircraft 23.

Further, unlike in FIG. 1, the fairing body 1 consists of three modules 11, 13, 15. In addition to the front module 11 and the rear module 15, a central module 13 is provided. The central module 13 is arranged between the front module 11 and the rear module 15. In this context, all of the modules 11, 13, 15 can be inclined or tilted with respect to one another. Further, the embodiment shown in FIG. 2 differs from that shown in FIG. 1 in that the shape of the fairing body 1 is changed by changing the angle between the individual modules 11, 13 and 15.

Alternatively, a fairing body 1 consisting of three modules 11, 13, 15 may comprise a combination of the mechanisms shown in FIG. 1 and FIG. 2. For example, a central module 13 could be tiltable with respect to a front module. At the same time, a rear module 15 may be insertable into the central module in a linear movement, for example along a rail.

In FIG. 3 and FIG. 4, the aircraft 23 is in the form of an aeroplane. In this context, FIG. 3 is a side view and FIG. 4 is a plan view of the aeroplane. The aeroplane comprises two aeroplane wings, in particular two aerofoils 25. Engines 5 are respectively arranged on the aerofoils 25, and produce an engine blast 7 as illustrated in FIG. 3. Further, fairing bodies 1 are respectively provided on the aerofoils 25 and encase a flap adjustment mechanism 3 (not shown in FIG. 3 and FIG. 4). The flap adjustment mechanism 3 may position the leading edge flaps 27 and trailing edge flaps 29, which are shown in FIG. 4, in accordance with the current flight manoeuvres and flight situations.

Finally, it is noted that expressions such as "comprising" and the like should not preclude further elements or steps being provided. It should further be noted that "a" or "an" does not preclude a plurality. Moreover, features which are disclosed in connection with the various embodiments may be combined with one another in any desired manner. It is further noted that the reference numerals in the claims should not be taken as limiting the scope of the invention.

LIST OF REFERENCE NUMERALS

1 Fairing body
3 Flap adjustment mechanism

5 Engine
7 Engine blast
9 Direction of flight/longitudinal axis of the aircraft
11 Front module
13 Central module
15 Rear module
17 Rail element
19 Extended state
21 Retracted state
23 Aircraft
25 Aerofoil
27 Leading edge flap
29 Trailing edge flap
37 Fairing body drive

The invention claimed is:

1. An aerodynamic fairing body for an aircraft,
the fairing body being configured so as to accommodate a flap adjustment mechanism;
the fairing body being configured so as to be arranged at a predetermined distance from an engine of the aircraft and near a blast produced by the engine,;
wherein the fairing body is configured to vary between at least one extended state and at least one retracted state;
wherein the fairing body is configured so as to take on the at least one retracted state during at least one of a take-off phase and a landing phase of the aircraft,
wherein the fairing body is configured so as to take on the at least one extended state during a cruising phase of the aircraft thereby reducing the flow resistance of the aircraft, and
wherein the total length of the fairing body in the direction of flight is smaller in the retracted state than in the extended state.

2. An aerodynamic fairing body for an aircraft,
the fairing body being configured so as to accommodate a flap adjustment mechanism;
the fairing body being configured so as to be arranged at a predetermined distance from an engine of the aircraft and near a blast produced by the engine,
wherein the fairing body is configured to vary between at least one extended state and at least one retracted state, and
wherein a variation in a shape of the fairing body from one of the at least one extended state and the at least one retracted state to the other of the at least one extended state and the at least one retracted state is associated with retraction and extension of flaps of the aircraft such that if the flaps are extended, the fairing body is retracted and if the flaps are retracted, the fairing body is extended.

3. The aerodynamic fairing body according to claim 1, wherein a variation in a shape of the fairing body from one of the at least one extended state and the at least one retracted state to the other of the at least one extended state and the at least one retracted state corresponds to a variation in length of the fairing body in a direction of flight of the aircraft.

4. The aerodynamic fairing body according to claim 1, wherein the fairing body comprises a front module and a rear module; and
wherein a variation in a shape of the fairing body is brought about by adjusting the rear module with respect to the front module.

5. The aerodynamic fairing body according to claim 4, wherein the front module is configured so as to receive the rear module.

6. The aerodynamic fairing body according to claim 4, further comprising:
a rail element;
wherein the front module is connected to the rear module by the rail element; and
wherein the rear module is configured so as to be moved into the front module in a linear movement along the rail element.

7. The aerodynamic fairing body according to claim 1, wherein the fairing body is dimensioned in such a way that the width of the fairing body is 5% to 12% of the length of the fairing body in the extended state.

8. The aerodynamic fairing body according to claim 1, wherein a variation in a shape of the fairing body is brought about by the flap adjustment mechanism.

9. An aircraft, the aircraft comprising:
an airfoil;
an engine producing a blast; and
an aerodynamic fairing body, the fairing body being configured so as to accommodate a flap adjustment mechanism;
the fairing body being configured to vary between at least one extended state and at least one retracted state;
wherein the engine and the fairing body are arranged on the airfoil of the aircraft;
the aircraft further comprising a flap configured so as to be retracted and extended;
wherein the fairing body is coupled to the flap in such a way that said fairing body is converted into a retracted state when the flap is extended; and
wherein the fairing body is coupled to the flap in such a way that said fairing body is converted into an extended state when the flap is retracted.

10. A method for manufacturing an aerodynamic fairing body according to claim 1, the method comprising:
arranging a fairing body on a flap adjustment mechanism of an aircraft at a predetermined distance from an engine and near a blast produced by the engine, and
configuring the fairing body to vary between at least one extended state and at least one retracted state;
wherein the fairing body is configured so as to take on the at least one retracted state during at least one of a take-off phase and a landing phase of the aircraft,
wherein the fairing body is configured so as to take on the at least one extended state during a cruising phase of the aircraft thereby reducing the flow resistance of the aircraft; and
wherein the total length of the fairing body in the direction of flight is smaller in the retracted state than in the extended state.

* * * * *